No. 657,164. Patented Sept. 4, 1900.
T. HORTON.
AUTOMATIC HOG WATERING TROUGH.
(Application filed June 29, 1900.)
(No Model.)
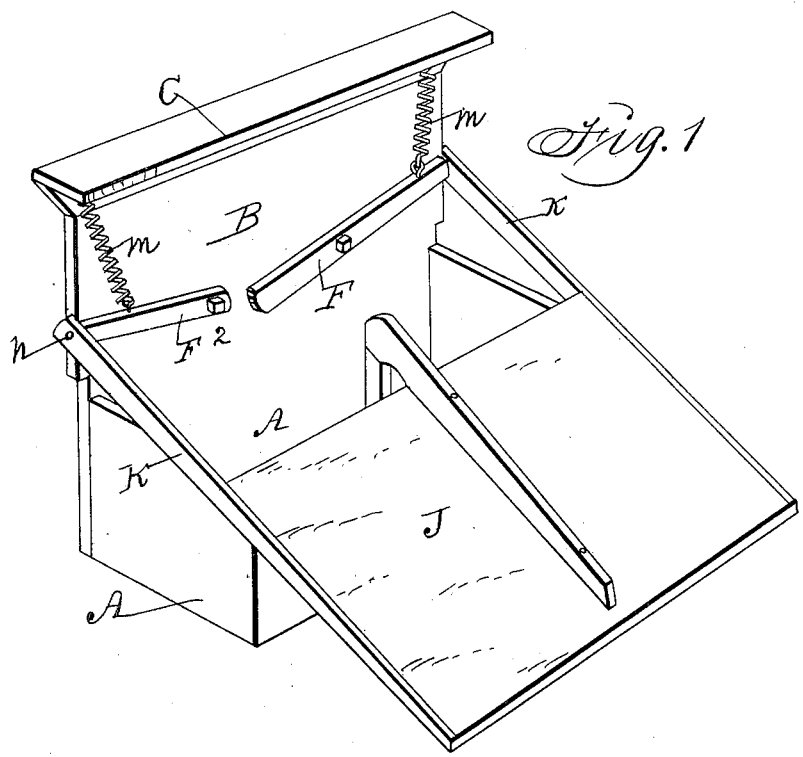
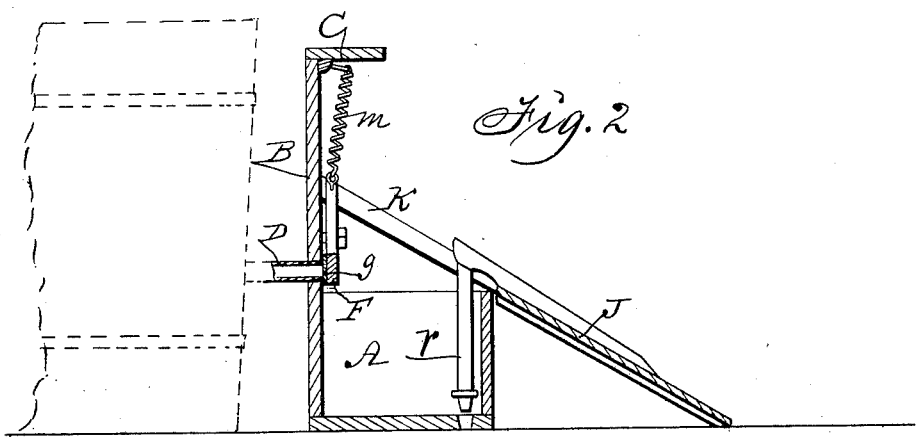

UNITED STATES PATENT OFFICE.

THOMAS HORTON, OF GROVELAND, IOWA.

AUTOMATIC HOG-WATERING TROUGH.

SPECIFICATION forming part of Letters Patent No. 657,164, dated September 4, 1900.

Application filed June 29, 1900. Serial No. 22,046. (No model.)

*To all whom it may concern:*

Be it known that I, THOMAS HORTON, a citizen of the United States, residing at Groveland, in the county of Clarke and State of Iowa, have invented a new and useful Automatic Hog-Watering Trough, of which the following is a specification.

My object is to provide a simple, cheap, and efficient automatic hog-waterer in which the weight of a hog will operate the mechanism as required to allow water to flow into the trough while the animal is in position to drink therefrom and prevented from getting in the trough, and when done drinking any water remaining in the trough will be allowed to flow out, so that there will be fresh water admitted into the trough whenever an animal comes to the trough to get a drink and in cold weather will prevent water from freezing in the trough.

My invention consists in the arrangement and combination of parts, as hereinafter set forth, pointed out in my claims, and illustrated in the accompanying drawings, in which—

Figure 1 is a perspective view showing my invention in position as required for practical use. Fig. 2 is a transverse sectional view showing the inlet and outlet valves, and dotted lines indicate how the trough is connected with a tank or other source of supply.

The letter A designates a trough that may vary in size as required to be adapted for one, two, or more animals drinking therefrom at the same time. The rear side of the wall has an upward extension B, adapted to support operative mechanism and to serve as a wall between the trough and the source of water-supply. A board C, fixed on top of the extension-wall B, serves as a cover for operative mechanism and also aids in preventing animals from getting into the trough with their feet. A pipe D, fixed in the extension-wall B, is designed to be connected with a tank, as indicated by dotted lines in Fig. 2, or with some other reservoir and source of water-supply. A spring-actuated lever F is pivoted to the front face of the wall B and provided with a fixed packing $g$ on its inside face and end in such a manner that it will serve as a valve for opening and closing the end of the pipe D. A short lever $F^2$ is pivoted to the wall on the other side of the pipe D to extend in an opposite direction from the lever F. Both of the levers F and $F^2$ have journals $h$ on their ends for connecting an operative platform therewith.

J is an inclined platform. It has fixed arms K at its ends that are pivotally connected with the journals $h$ at the ends of the levers in the manner shown or in any suitable way that will allow the levers to be actuated by the weight of an animal that steps on the platform to get access to the trough to drink water therefrom. It is obvious that as the top of the platform is depressed the inner end of the lever F will rise and uncover the end of the pipe D, as required, to allow water to flow therefrom into the trough, and when the animal gets off the platform contractile springs $m$, fixed to the wall B and the levers F and $F^2$, will replace the levers to their normal positions and cut off the flow of water from the pipe D into the trough. A plug-valve $r$, connected with the hinged platform as shown or in any suitable way, will be closed as the platform descends and water flows into the trough, and when an animal has been supplied with water and leaves the trough and platform the plug-valve will be lifted from the aperture in the bottom of the trough, and any water remaining in the trough will be allowed to escape, so that there will be no accumulation of water in the trough to become stagnant, and all animals that come for drink in succession will always get fresh and clean water.

Having described the construction, purpose, and operation of my invention, its practical utility will be readily understood by persons familiar with the art to which it pertains, and what I claim as new, and desire to secure by Letters Patent therefor, is—

1. In a trough for watering hogs, a wall extending upward from the rear side of the trough, a supply-pipe fixed in said wall, a lever pivoted to the face of said wall and provided with packing on its end for closing the end of said pipe and an inclined platform in front of the trough pivotally connected with said lever, arranged and combined to operate in the manner set forth, for the purposes stated.

2. In a trough for watering hogs, a wall extending upward from the rear side of the trough, a supply-pipe fixed in said wall, a lever pivoted to the face of said wall and provided with packing on its end for closing the end of said pipe, an inclined platform in front of the trough pivotally connected with said lever, an aperture in the bottom of the trough, and a plug-valve carried by the said platform to open and close said aperture, arranged and combined to operate in the manner set forth for the purposes stated.

3. An automatic trough for watering animals, comprising an oblong trough, a wall extending upward at the rear side of the trough, a board fixed on top of said wall to project forward, two levers pivoted to the front face of the wall, an inclined platform in front of the trough and provided with fixed arms at its ends and said arms pivotally connected with the outer ends of said levers, a supply-pipe fixed in the wall, packing fixed to the end of one of said levers for closing said supply-pipe, springs fixed to the wall and to said levers, an aperture in the bottom of the trough and a valve carried by the inclined platform for closing said aperture, all arranged and combined to operate in the manner set forth for the purposes stated.

THOMAS HORTON.

Witnesses:
B. W. WELCH,
M. H. PARK.